(12) United States Patent
Hausin et al.

(10) Patent No.: US 6,821,426 B1
(45) Date of Patent: Nov. 23, 2004

(54) PROCESS FOR TREATING A BODY OF WATER

(75) Inventors: Volker A. Hausin, Rochester, NY (US); Daniel J. LaGasse, Lyons, NY (US); Darrin J. Costantini, Rochester, NY (US)

(73) Assignee: TVT US Corporation, Rochester, NY (US)

( * ) Notice: Subject to any disclaimer, the term of this patent is extended or adjusted under 35 U.S.C. 154(b) by 39 days.

(21) Appl. No.: 10/336,930

(22) Filed: Jan. 6, 2003

Related U.S. Application Data

(60) Provisional application No. 60/346,578, filed on Jan. 8, 2002.

(51) Int. Cl.[7] .............................. C02F 3/06; C02F 7/00
(52) U.S. Cl. ...................... 210/617; 210/620; 210/629; 210/747; 210/170; 210/150
(58) Field of Search ............................. 210/615, 617, 210/620, 629, 747, 170, 150, 151, 242.2, 220

(56) References Cited

U.S. PATENT DOCUMENTS

| | | | | |
|---|---|---|---|---|
| 3,235,234 A | * | 2/1966 | Beaudoin | 210/747 |
| 3,956,124 A | * | 5/1976 | Fast et al. | 210/629 |
| 3,984,323 A | * | 10/1976 | Evens | 210/220 |
| 4,347,143 A | * | 8/1982 | Righetti | 210/242.2 |
| 4,350,589 A | * | 9/1982 | Stog | 210/242.2 |
| 4,514,343 A | * | 4/1985 | Cramer et al. | 210/242.2 |
| 5,228,998 A | * | 7/1993 | DiClemente et al. | 210/617 |
| 5,421,999 A | * | 6/1995 | Poole et al. | 210/170 |
| 5,507,950 A | * | 4/1996 | Senda et al. | 210/615 |
| 5,554,291 A | * | 9/1996 | Scanzillo et al. | 210/617 |
| 6,022,476 A | * | 2/2000 | Hausin | 210/747 |
| 6,103,123 A | * | 8/2000 | Gantzer | 210/629 |
| 6,231,766 B1 | * | 5/2001 | Hausin | 210/620 |
| 6,348,147 B1 | * | 2/2002 | Long | 210/170 |

* cited by examiner

Primary Examiner—Christopher Upton
(74) Attorney, Agent, or Firm—Howard J. Greenwald

(57) ABSTRACT

A process for treating a body of water in which a bioreactor and a water eductor are located in a body of water such that the eductor is submerged beneath the body of water to a depth of at least about 3 feet. The water eductor produces a water flow at a rate of at least about 60 feet per minute; the water flow is substantially parallel to the surface of the body of water. Water is also passed through a bioreactor that contains a plurality of bio-suspension elements within an enclosure located above a screen in the enclosure.

17 Claims, 11 Drawing Sheets

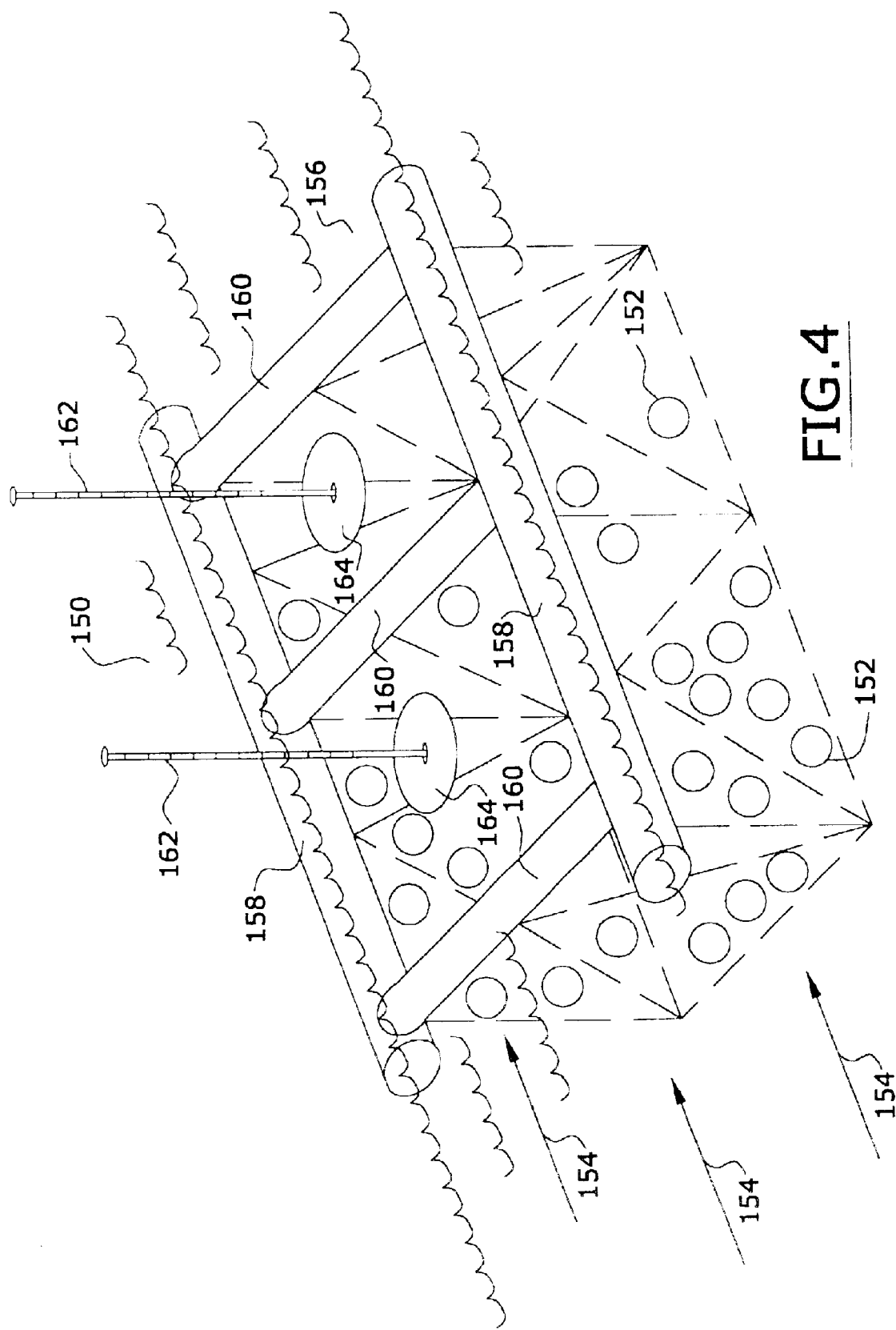

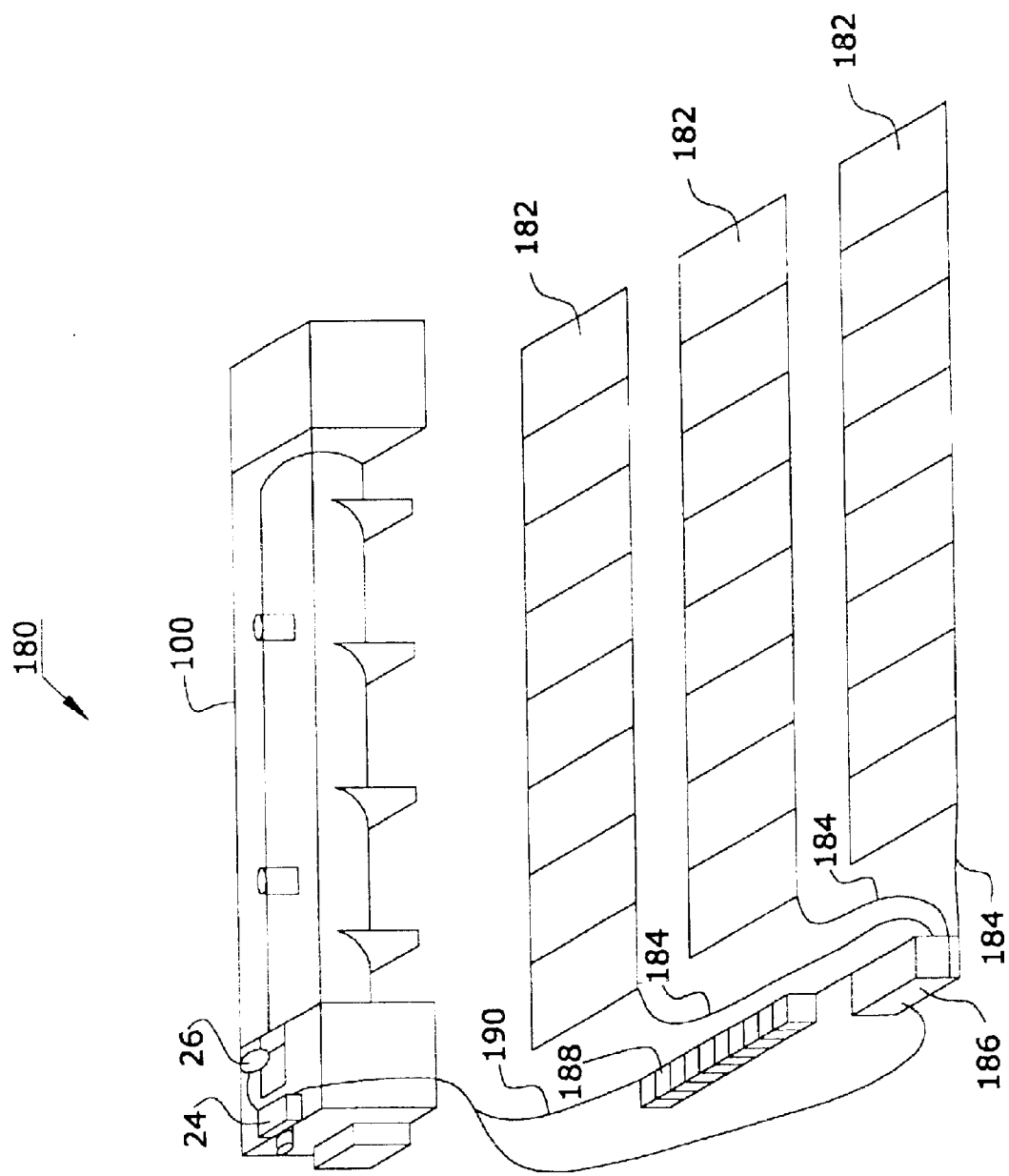

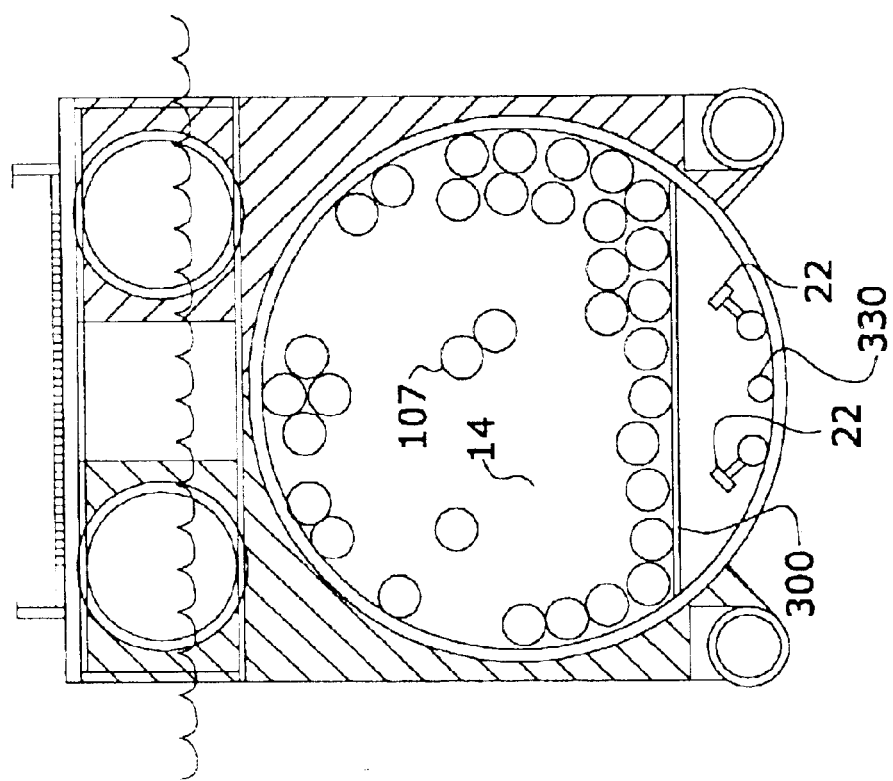

PROCESS FOR TREATING A BODY OF WATER

CROSS-REFERENCE TO RELATED PATENT APPLICATION

This patent application claims priority based upon applicants' provisional patent application 60/346,578, filed on Jan. 8, 2002.

FIELD OF THE INVENTION

A process for removing biodegradable materials from water in which the water is contacted with biological microorganisms disposed on a plurality of bio-suspension elements; both a water eductor and a bioreactor are used in this process.

BACKGROUND OF THE INVENTION

This patent application describes certain improvements upon the technology disclosed in applicant's prior patents, U.S. Pat. Nos. 6,231,766 and 6,022,476, the entire disclosures of which are hereby incorporated by reference into this specification.

U.S. Pat. No. 6,022,476 discloses and claims a method for removing selected biodegradable materials from a body of water.

The process of the instant application is similar to the process of U.S. Pat. No. 6,231,766, comprising the steps off (a) disposing a plurality of bio-suspension elements within an enclosure which is at least partially submerged in a body of water, wherein a screen is disposed within said enclosure, wherein said bio-suspension elements provide surfaces for supporting the growth of at least five different biological microorganisms, and wherein said bio-suspension elements are disposed above said screen, (b) introducing said at least five different biological microorganisms into said enclosure along with said water (c) continuously agitating, aerating, and feeding said water into said enclosure at a rate of at least about 20 feet per minute, (d) forcing air through said screen, whereby treated water is produced, and (e) continuously removing said treated water from said enclosure at a rate of at least about 20 feet per minute.

In general, and as is disclosed, e.g., in U.S. Pat. No. 6,231,766, applicants' process involves removing selected biodegradable materials from water. In the first step of this process, there is disposed a plurality of bio-suspension elements within an enclosure, wherein a screen is disposed within said enclosure, wherein said bio-suspension elements provide surfaces for supporting the growth of at least five different biological microorganisms, and wherein said bio-suspension elements are disposed above said screen. In the second step of this process, there is introduced said at least five different biological microorganisms into said enclosure along with said water, wherein said water is continuously agitated, aerated and preferably fed into said enclosure at a rate of at least about 20 feet per minute. In the third step of the process, air is forced through said screen, whereby treated water is produced. Treated water is continuously removed from the enclosure, preferably at a rate of at least 20 feet per minute.

It is an object of this invention to provide an improved, more efficient process for treating a body of water.

SUMMARY OF THE INVENTION

In accordance with this invention, there is provided a process for treating a body of water. In the first step of this process, a bioreactor and a water eductor are disposed in a body of water such that the water eductor is separated from the bioreactor by a distance of at least 10 feet; the water eductor is disposed beneath the body of water, to a depth of at least about 3 feet; and the bioreactor is at least partially submerged in the body of water. In the second step of the process, water is moved through the water eductor at a rate of at least about 60 feet per minute while being aerated; the water flow produced by the water eductor is substantially parallel to the surface of the body of water. In the third step of the process, water is passed through the bioreactor; the bioreactor used contains plurality of bio-suspension elements within an enclosure, wherein a screen is disposed within said enclosure, wherein said bio-suspension elements provide surfaces for supporting the growth of at least five different biological microorganisms, and wherein said bio-suspension elements are disposed above said screen; in this third step, there are introduced at least five different biological microorganisms into said enclosure along with said water, wherein said water is continuously agitated, aerated and preferably fed into said enclosure at a rate of at least about 20 feet per minute; whereby treated water is produced, and the treated water is continuously removed from the enclosure, preferably at a rate of at least 20 feet per minute.

BRIEF DESCRIPTION OF THE DRAWINGS

The invention will be described by reference to the specification and to the enclosed drawings, in which the elements are described by like numerals, and wherein:

FIG. 4 is a schematic view of a cleaning apparatus that contains limestone nodules; of a preferred process of the invention;

FIG. 5 is a perspective view of a cleaning apparatus powered by solar panels

FIGS. 7A and 7B are side and end views, respectively, of another cleaning apparatus of the invention;

DESCRIPTION OF THE PREFERRED EMBODIMENTS

Figure 1:
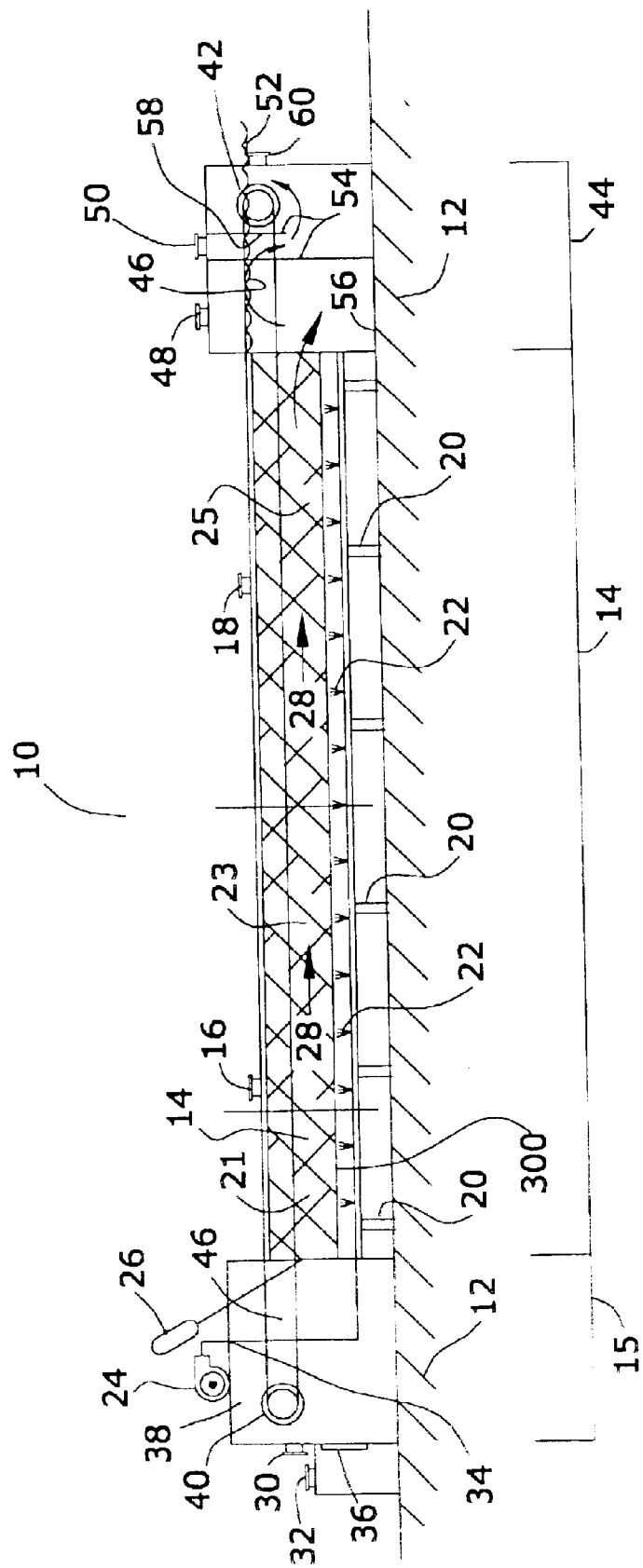
FIG. 1 is side view of one preferred water treatment apparatus of the invention.

FIG. 1 is a side view of one preferred water treatment apparatus 10 that is disposed on land 12. The enclosure 14 treats the water in substantial accordance with the process described in U.S. Pat. No. 6,231,766 and in substantial accordance with the preceding paragraph of this specification.

In the embodiment depicted in FIG. 1, the enclosure 14 preferably has a substantially cylindrical shape; see, e.g., FIG. 8 of U.S. Pat. No. 6,231,766. However, unlike the embodiment depicted in such patent, the enclosure 14 depicted in FIG. 1 is preferably substantially closed. Thus, in this preferred embodiment, the pressure within the enclosure 14 is higher than atmospheric pressure by from about 1 to about 2 pounds per square inch. In other words, the pressure within the enclosure 14 is from about 1 to about 2 pounds per square inch gauge.

Without wishing to bound to any particular theory, applicant believes that the use of a closed, pressurized enclosure 14 helps facilitate the flow of the water through the enclosure and helps the enclosure avoid becoming plugged.

In the embodiment depicted in FIG. 1, enclosure 14 is equipped with inspection ports 16 and 18 that allow visual inspection of the media within the enclosure 14. The inspection ports 16 and 18 preferably can be opened so that samples within the enclosure 14 can be removed and analyzed.

In the embodiment depicted in FIG. 1, the enclosure 14 is preferably constructed of high density polyethylene. The enclosure 14 is preferably supported by a multiplicity of supports.

Disposed within enclosure 14 are a multiplicity of coarse bubble diffuser heads ("bubblers") 22 that are operatively connected to one or more sources of air 24, such as a positive displacement blower; in one embodiment, the sources of air 24 are an air compressor (not shown).

The bubblers 22 are preferably uniformly disposed along the length of the enclosure 14 and are adjustable so that their air flows can be aimed in various directions.

In one embodiment, the bubblers 22 are uniformly spaced along the length of the enclosure 14. In another embodiment, the bubblers 22 are non-uniformly spaced along the length of the enclosure 14. In either case, it is preferred to space such bubblers 22 so that the distance between adjacent bubblers is no greater than about 36 inches and, preferably, is no greater than about 30 inches.

For the sake of simplicity of representation, three sections of enclosure 14, sections 21, 23, and 25, are depicted in FIG. 1. The section 21 preferably extends from about 20 to about 30 percent of the length of the enclosure 14. The section 23 preferably extends from about 30 to about 50 percent of the length of the enclosure 14. The section 25 preferably extends from about 20 to about 40 percent of the length of the enclosure 14.

Within the section 21, the spacing between adjacent bubblers 22 is such that such bubblers are preferably no more than about 18 inches from each other and, preferably are disposed so that their bubbles are directed into a multiplicity of different directions.

Within the section 23, the spacing between adjacent bubblers 22 is such that such bubblers are from about 24 to about 40 inches from each other, and preferably from about 30 to about 36 inches from each other.

Within the section 25, the spacing between adjacent bubblers 22 is preferably from about 12 to about 28 inches apart and, more preferably, from about 12 to about 24 inches apart.

The blower 24 is adjustable and can deliver air at various velocities. If inspection of the ports 16/18 reveals an undesired amount of biofilm build-up, then the blower 24 can be adjusted to increase the air flow and turbulence and thus decrease the biofilm build-up.

In one embodiment, for at 2.0" diameter cylindrical enclosure 14, the blower 24 provides from about 250 to about 350 cubic feet per minute of air. In this embodiment, the blower 24 preferably provides from about 275 to about 325 cubic feet per minute of air. As will be apparent to those skilled in the art, with differently sized and/or shaped enclosures 14, the amount of air so provided will be a function of the internal volume of the enclosure.

Referring again to FIG. 1, and in the preferred embodiment depicted therein, in addition to air from blower 24, aerated water is provided to the enclosure 14 by aerator 26. One may use one or more of the aerators described in U.S. Pat. No. 6,231,766. In one embodiment, for example, for a 2 inch diameter cylindrical enclosure 14, at least about 5.0 pounds of oxygen per hour is introduced into enclosure 14 by the aerator 26. It is preferred to introduce at least about 7.0 pounds of oxygen per hour into enclosure 14, for a 2" diameter enclosure from aerator 26. In embodiment, the aerator 26 introduces from about 5 to about 10 pounds of oxygen per hour into enclosure.

In the apparatus and process depicted in FIG. 1, there is preferably turbulent flow of the liquid within the enclosure 14.

The treated water within enclosure 14 preferably flows through the enclosure 14 in the direction of arrow 28 at a flow rate of at least about 30 feet per minute and, in one embodiment, preferably at least about 60 feet per minute.

Referring again to FIG. 1, and also to FIG. 7A, and in the preferred embodiment depicted, a screen 300 is disposed within the enclosure 14 below a multiplicity of bio-suspension elements 107. This screen is similar to the screen 300 that is depicted in U.S. Pat. No. 6,231,766 (and discussed at column 10 of such patent). The "screen 300" used in the enclosure 14 is preferably made of fiberglass.

As is apparent to those skilled in the art, and with reference to claim 1 of U.S. Pat. No. 6,231,766, in applicant's process, the tubular or rectangular construction of the Floating System with high density polyethylene has at the one end (identified in this application as the Influent Section component) with the jet aeration system drawing the lagoon wastewater into the bio-chamber and blowing the oxygenated wastewater through the media resulting in considerable head pressure. The oxygenated and agitated waste water is exposed to application specific bacteria (bio-film) on the media at a calculated minimum velocity to be discharged at the other end as (identified in this application as the Clarifier component) microbiologically treated wastewater for re-circulation and continues inoculation within the lagoon system where it is ultimately clarified before discharge.

Referring again to FIG. 1, and in the preferred embodiment depicted therein, the device 10 also is comprised of an influent section component 15. In the preferred embodiment depicted, this section 15 is preferably a rectangular structure which is 8'×8'×10'. This Influent Section 15 receives influent wastewater (preferably by pumping) through influent port 30. The influent port 30, in one embodiment, is constructed of high density polyethylene and has a diameter of 8 inches.

In the embodiment depicted in FIG. 1, a clean-out port 32 is provided for removing accumulated solids. The clean out process allows continuous operation by trapping trash with trash grate 34 and thereafter sealing off the accumulated trash from the Influent Section 15 with a shear gate 36. As will be apparent, when the shear gate 36 is closed, the entire section may be cleaned without shutting down the main operation.

On the upper sidewall 38 (and on the opposed sidewall, not shown) there is disposed a recycle return port 40; the return port 40 is typically a 16" flange.

In one preferred embodiment, the recycle return port 40 is disposed at a lower level than the clarifier port 42 disposed within clarifier 44. This arrangement facilitates the flow of water from clarifier 44 to port 40 with gravity, via pipe 46.

In one embodiment, the recycle return ports 40 are located at both sides of the influent section 15. Within the influent section 15 is preferably disposed the diagonal trash grate 34, which preferably is constructed of stainless steel.

In one embodiment, disposed on top of the influent section 15 are moving parts (such as elements 24 and 26)

and electrical systems (not shown) for ease of operations and maintenance. An electrical cabinet (not shown) with a variable frequency drive is preferably disposed on top of such section 15. A jet aerator 26 preferably provides velocity and compressed atmospheric air for oxygen transfer into the wastewater; and the blower system 24 preferably provides additional turbulence and oxygen for removal of mature biofilm and re-circulation of the wastewater for repeated treatment.

In one embodiment, the enclosure 14 is a pipe with an internal diameter of from about 60 to about 72 inches that is comprised of high density polyethylene; and the aerator 26 is a 7.5 horsepower jet aerator that delivers at least about 11 pounds of oxygen per hour to the system.

In another embodiment, not shown, the enclosure 14 is preferably an 8'×8'×32' rectangular reinforced device comprised of high density polyethylene to increase the volume and treatment capacity. This embodiment will be described elsewhere in this specification.

Referring again to FIG. 1, and in the preferred embodiment depicted therein, the treated water from enclosure 14 is fed into clarifier 44. The influent section 15 and the clarifier section are connected with the bio-chamber 14. Using either an high density polyethylene enclosure 14 (for low volume) or a rectangular sealed structure 14 (not shown in FIG. 1) for high volume for the bio-chamber to grow the bio-film on media, clean out ports 48/50 are preferably used for quality control. In one embodiment, not shown, a movable ladder, much like the ones seen at airports, achieves safe access to the clean out ports.

The clarifier 44 preferably is a rectangular structure, preferably 8'×8'×10'. This clarifier 44 is used for wastewater clarification and sludge separation to recirculate the suspended solids back into the head-works for additional passes of treatment time. Clean out Ports 48/50 for sludge accumulation are located on top of the clarifier 44 where the sludge can be removed by a suction hose (not shown) to be dewatered with existing technology. Depending on the location of the unit and the application the sludge can be used as fertilizer or dewatered for use as fuel.

Referring again to FIG. 1, disposed within the clarifier 44 are steel baffles 54 to retain solid material(s); the height and location of these baffles preferably will vary based upon the application.

In one embodiment, two such steel baffles 54 are disposed within clarifier 44. The first such baffle 54 is adapted to separate heavy solid material(s), which then sink to the bottom 56 of the clarifier. The second such baffle 54 is adapted to restrain floating solid materials (such as grease, fats, oil, etc.) at point 58.

The sludge is separated from the treated wastewater at location 56. Thereafter, one preferably discharges the clarified wastewater through effluent port 60. The water so discharged can go into sewer systems, rivers, ponds, lakes, oceans or closed systems for reuse as industrial water or into a Water Reuse Component for potable water.

The clarifier 44 is preferably air tight and, consequently, has the same pressure (of from about 1 to about 2 pounds per square inch gauge.) as is present in the enclosure 14. Without wishing to be bound to any particular theory, applicant believe that this pressure will facilitate the return of the treated water via pipe 46.

Figure 2:
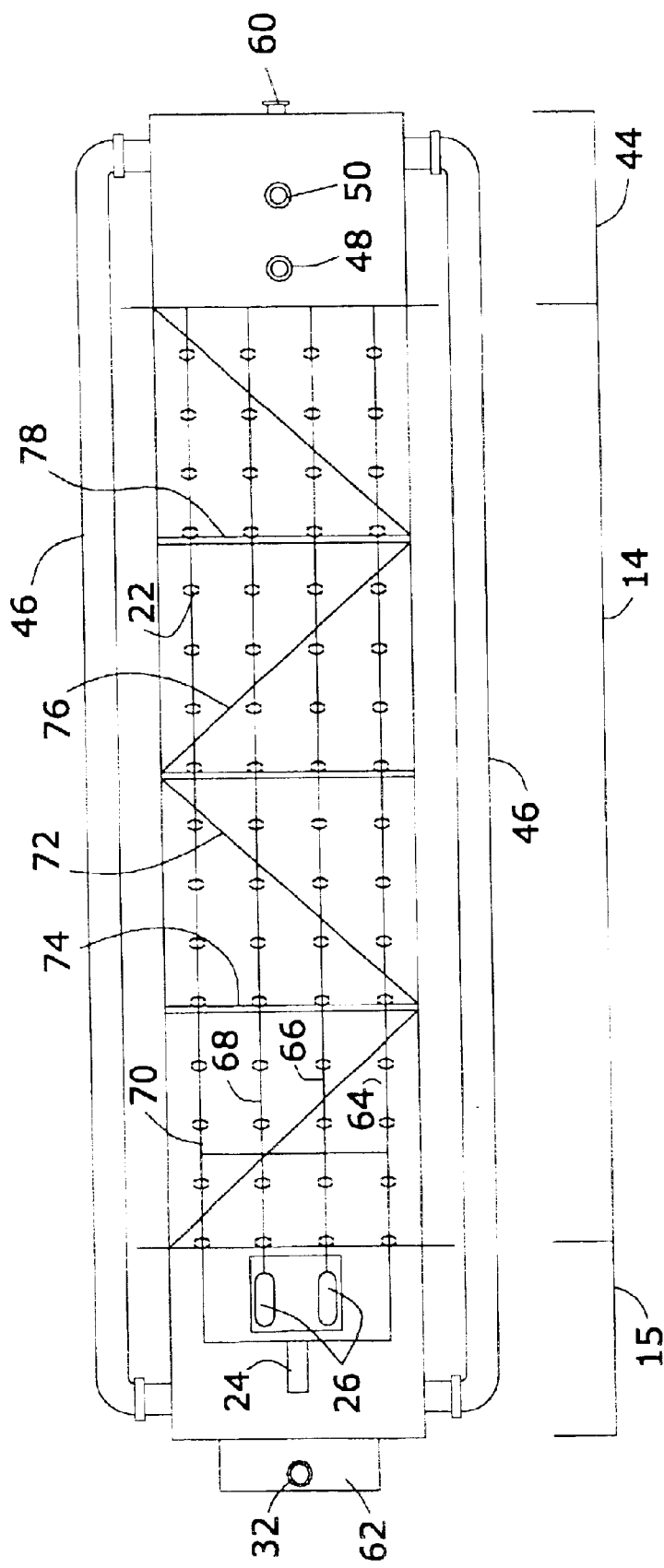
FIG. 2 is a top view of another water treatment apparatus.

FIG. 2 is a top view of a device similar to that depicted in FIG. 1, from which unnecessary detail has been omitted for the sake of simplicity of representation. The device of FIG. 2 differs from the device of FIG. 1 in that: (a) it is comprised of two jet aerators 26 rather than one, (b) it is comprised of a solids removal box 62, (c) and it is comprised of four rows of bubble diffusers 22, rows 64, 66, 68, and 70.

In the embodiment depicted in FIG. 2, four rows of such bubble diffusers 22 are illustrated; each of these rows preferably has at least 16 such bubble diffusers 22. In another embodiment, not shown, one can have two such rows, three such rows, or four or more such rows, and the like.

In the embodiment depicted in FIG. 2, structural supports 72, 74, 76, and 78 are disposed within the enclosure 14 to help support such enclosure.

Figure 3A:
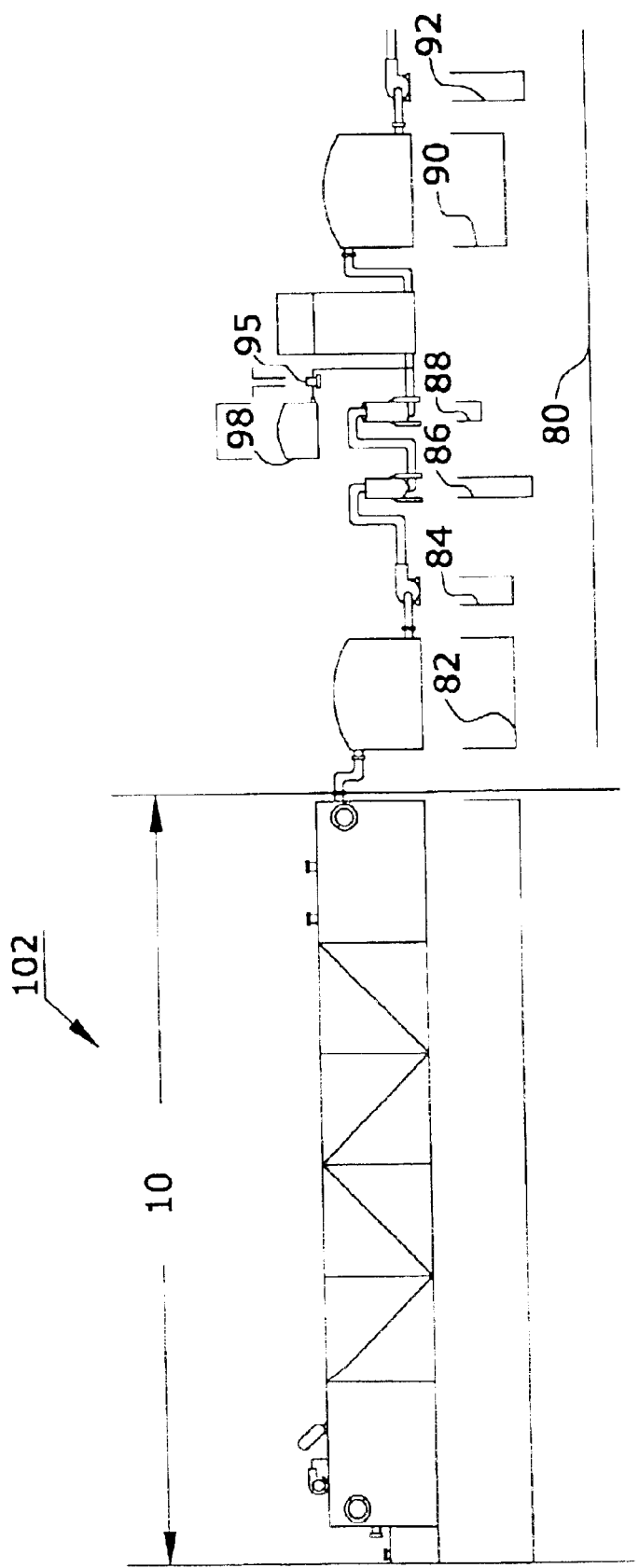
FIGS. 3A and 3B are side views of cleaning apparatuses of the invention.
Figure 3B:
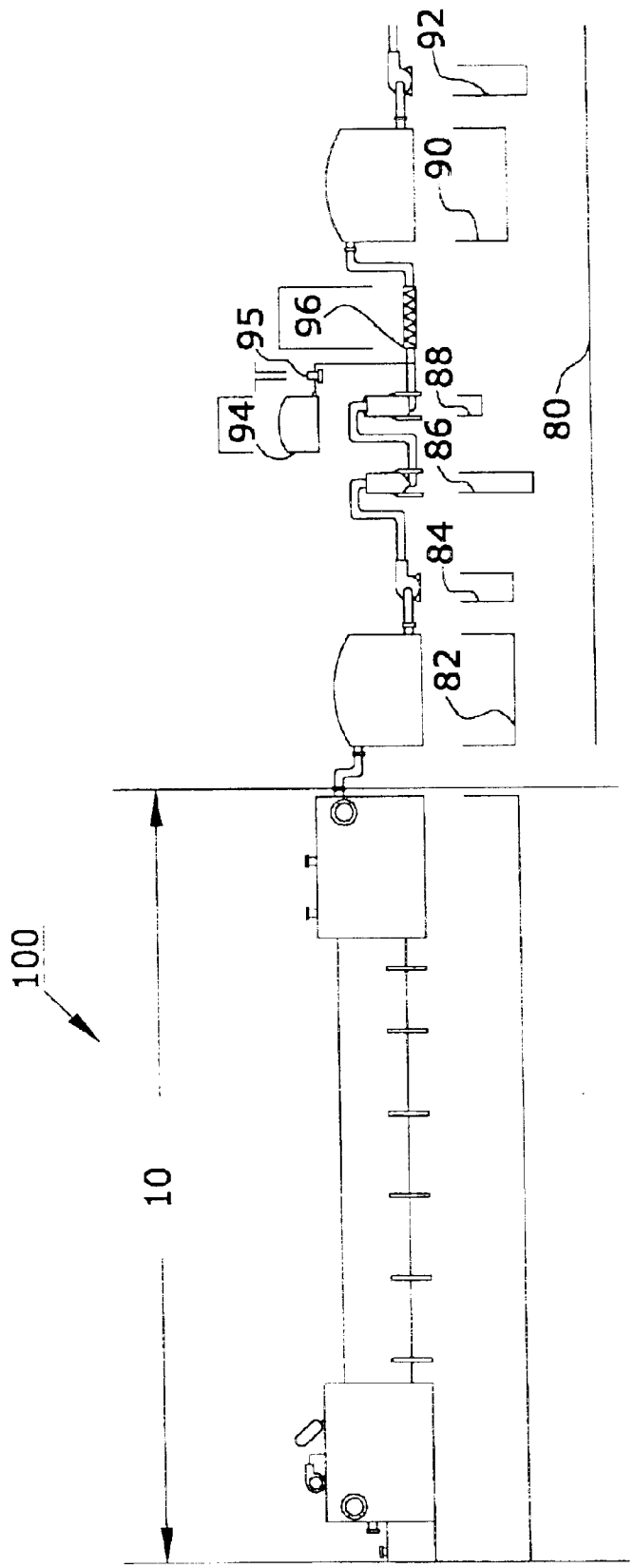

FIGS. 3A and 3B are schematic representations of cleaning devices 100 and 102. Each of the devices 100 and 102 is comprised of cleaning apparatus 10, that has been described elsewhere in this specification (see FIGS. 1 and 2).

In device 100, a relatively low-volume device 10 is depicted; this device 10 treats from about 180,000 to about 300,000 gallons of water per hour. In device 102, a relatively high-volume device is depicted that treats at least about three times as much water as the low volume device. In one embodiment, the cross-sectional area of the device 100 is 19.6 square feet, and the cross-sectional area of the device 102 is 64 square feet. The preferred low-volume device 100 can treat 1000 pounds of biological oxygen demand per day, whereas the preferred high-volume device 102 can treat up to 3,000 pounds of biological oxygen demand per day, or more.

Referring again to FIGS. 3A and 3B, each of devices 100 and 102 is comprised of a water-reuse apparatus 80. In the embodiment, the water-reuse component is a rectangular component that is 8'×8'×10'.

This water reuse component 80 is comprised of a feed tank 82, a feed pump 84 for pressurizing and transporting the water, a rough filtration assembly 86, a fine filtration assembly 88, an insulated holding tank 90, and a distribution pump 92.

The filters 86/88 preferably comprise a series of filters from bag filters, cartridge filters or sand/multimedia filters to prevent quick clogging of membrane filters.

In one embodiment, membrane filters are used that are of less than 0.40 porosity for water reuse according to the Environmental Protection Agency Surface Water Regulations. In this embodiment, such membrane filters demonstrate greater than 3 log removal of giardia cysts.

In each of the devices 100 and 102, means are provided for disinfecting the treated water. Disinfection can be achieved by chlorination (see chlorine holding tank 94) or ultraviolet treatment. In this embodiment, a metering pump 95 provides metered amounts of the chlorine to a static mixer 96, and the chlorine-containing potable water is then fed to holding tank 90, to be discharged back into the system with the distribution pump 92.

A similar arrangement is shown in FIG. 3A, with the exception that a hydrogen peroxide holding tank 98 is used. The hydrogen peroxide is fed through a metering pump 95 to a ultraviolet/oxidation system 99 and thence to holding tank 90 and distribution pump 92.

In one embodiment, one or more chemicals are added to the system of devices 100 and/or 102 by the means disclosed in applicant's U.S. Pat. No. 6,022,476, the entire disclosure of which is hereby incorporated by reference into this specification. This U.S. patent discloses the addition of small amounts of measured substances. In the case of large quantities with chemicals for water or wastewater treatment, one may use floating submerged rectangular structures (not shown) attached to the out flow end of the bio chamber (media section).

FIG. 4 is a schematic view of a cleaning apparatus 150 that contains limestone nodules 152. The cleaning apparatus 150 is preferably attached to the output end of a floating unit, such as, e.g., the floating unit depicted in FIG. 1 of U.S. Pat. No. 6,231,766 and/or one of the bioreactors of this invention. Treated water from said output end is fed in the direction of arrows 154, and it contacts the limestone nodules 152. Since limestone is mildly basic, it tends to neutralize the acidity of the acid water 156.

The cleaning apparatus 150, in the embodiment depicted, is preferably caused to float on the surface of the water 156 by floating members 158 and 160. In one embodiment, these floating members 158 and 160 consist essentially of high density polyethylene.

Disposed within the cleaning apparatus 150 are measuring sticks 162 connected o plates 164 that, in turn, rest on the bed of limestone nodules 152. As the limestone nodules dissolve after neutralizing acid water, the plates 164 descend in the direction of arrows 166. Thus, visual inspection of the heights of sticks 162 provides an indication of the amount of limestone remaining within cleaning unit 150.

The cleaning device 150 may be referred to as a "Floating Lime Stone Cage" that preferably is located at the outflow end of the media (not shown), is preferably accessible from the water surface (for refilling), and can be inspected as to the dissolved rate of transferring lime into Lake water. The rate of dissolved limestone into a body of lake water is variable and depends on the level of acidity and the velocity of the treated water re-circulating through applicant's bio-system into the body of water.

Solar Power & Electrical Storage Component

As is illustrated in FIG. 5, the device 100 and/or the device 102 may be powered by one or more conventional power supplies, such as fuel cells, solar panels, wave power, electrostrictive generators, and the like.

In the device 180 illustrated in FIG. 5, a multiplicity of solar panels 182 are disposed to the side of the device 100. The solar panels may be floating, or on land, and/or attached to the device 102.

The output of the solar panels is fed via lines 184 to controller 186. The controller is adapted to convert the output of the solar panels 182 to any form of direct, indirect, pulsed, or alternating current.

In one embodiment, the output from controller 186 is fed to one or more storage devices 188. Any conventional storage devices may be used such as, e.g., batteries, capacitors, etc. Alternatively, or additionally, the output from controller 186 is fed directly to the aerator(s) 26 and/or the blower(s) 24. Alternatively, some or all of the power required by these devices is fed from the storage device(s) 188 via line 190.

In one embodiment, not shown, applicants' device has fiberglass railings, which, in accordance with OSHA regulations, are at least 42" high, thereby allowing the solar power plates 182 to be attached for the entire length of the system. Total requirements of solar panels 182 depend on the running time of providing electricity for the floating biosystems, which, in one embodiment, require a total of 10/11 horsepower for operation. The practical application of solar power is suggested for extremely remote locations, where electricity or diesel generators are not available.

In one embodiment, the device 10 (see FIG. 1) does not require more than 25 horsepower for operation.

In one embodiment, such as embodiment 180, a series of storage batteries are needed for continuous operation. The electrical setup allows for intermittent operation from either the storage batteries to provide electrical power, diesel generator power or power from the solar panels.

In one embodiment, transformers within the electrical cabinet also provide power for standard outlets for operation of hand tools.

The mechanics of the solar panels 182 are preferably of such a nature, that, while in transport, they are secured and easily opened on site at the appropriate angle for maximum sun exposure. At the expanded working position, a slight angle is necessary to allow for drainage of rain and disposal of snow from the solar surface. A free flow of air currents between the structure and the mechanics to support the solar panels is desired to prevent damage from high winds.

Instrumentation Component

In one embodiment, attached to or within the electrical cabinet (not shown) is instrumentation as the specific application or the customer process control center may demand. The system can function thus as a scientific platform to give any data to any desired location, either by satellite, cellular or radio frequency (RF), linked to telephone, pager or internet service. Remote sites with this instrumentation can be integrated for process control and quality control.

A preferred process of the invention

Figure 6:
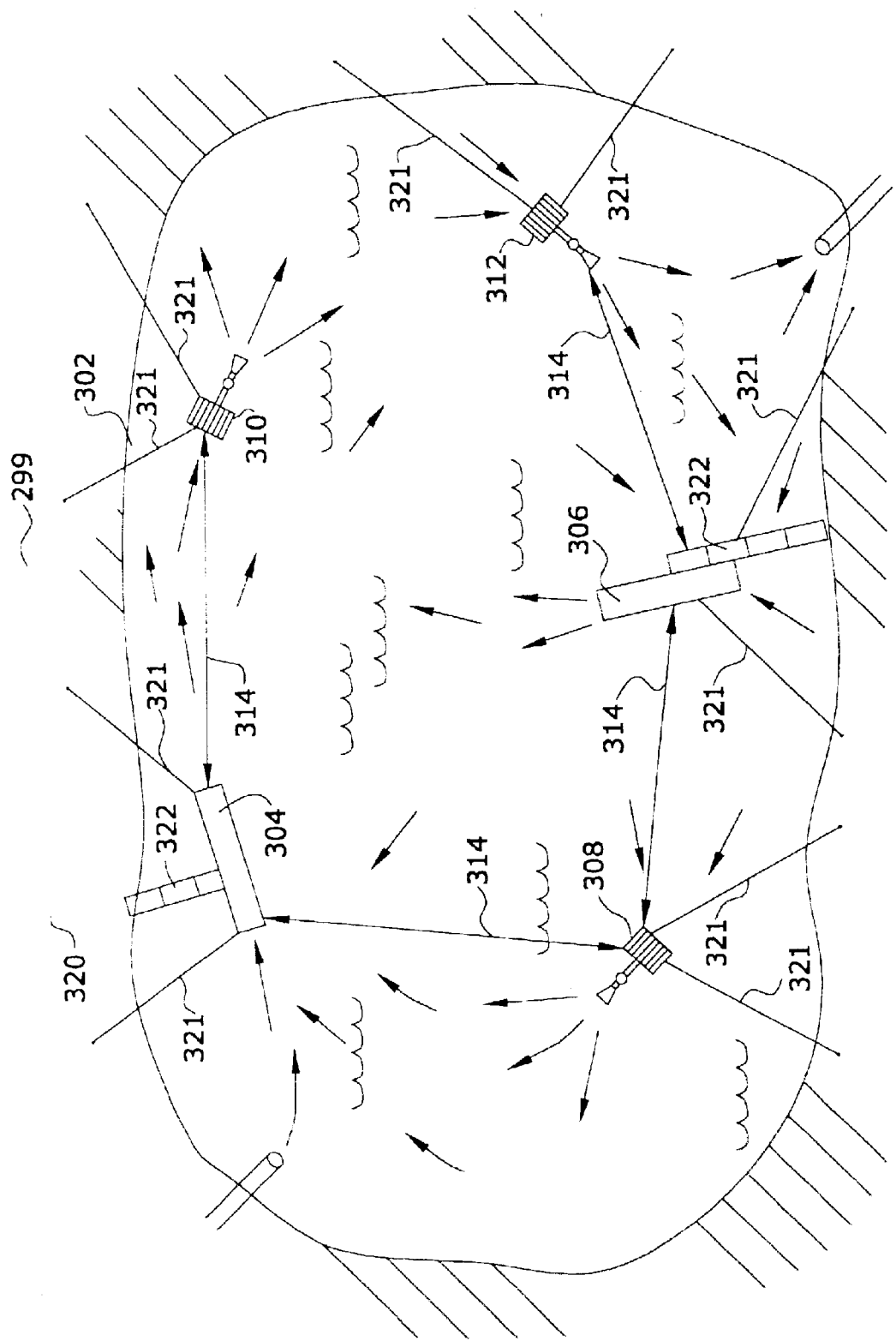
FIG. 6 is schematic view of one process of the invention.

FIG. 6 is a schematic illustration of one preferred process 300 for treating a body of water 302, such as waste-water lagoon 302. In the process depicted, and in the preferred embodiment depicted, bioreactors 304 and 306 are disposed within the lagoon 302. One may use from about 1 to about 20 such bioreactors 304/306 and, preferably, from about 1 to about 10 such bioreactors 304/306.

In the process depicted in FIG. 6, each of the bioreactors 304 and 306 is preferably partially submerged in the body of water 302. This is best illustrated in FIG. 7A, it will be seen that a portion 303 of the bioreactor 304 is submerged beneath the surface 305 of the body of water 302 by a distance 307 of at least about 3 feet. In one embodiment, distance 307 is at least about 4 feet.

Referring again to FIG. 6, and in the embodiment depicted, it will be seen that a multiplicity of eductors 308/310/312 are also utilized in the process. It is preferred to separate each eductor 308/310/312 from each adjacent bioreactor 304/306 by a distance 314 of at least about 10 feet and, preferably, at least about 20 feet. In one embodiment, the distance 314 is at least about 50 feet.

Figure 8A:
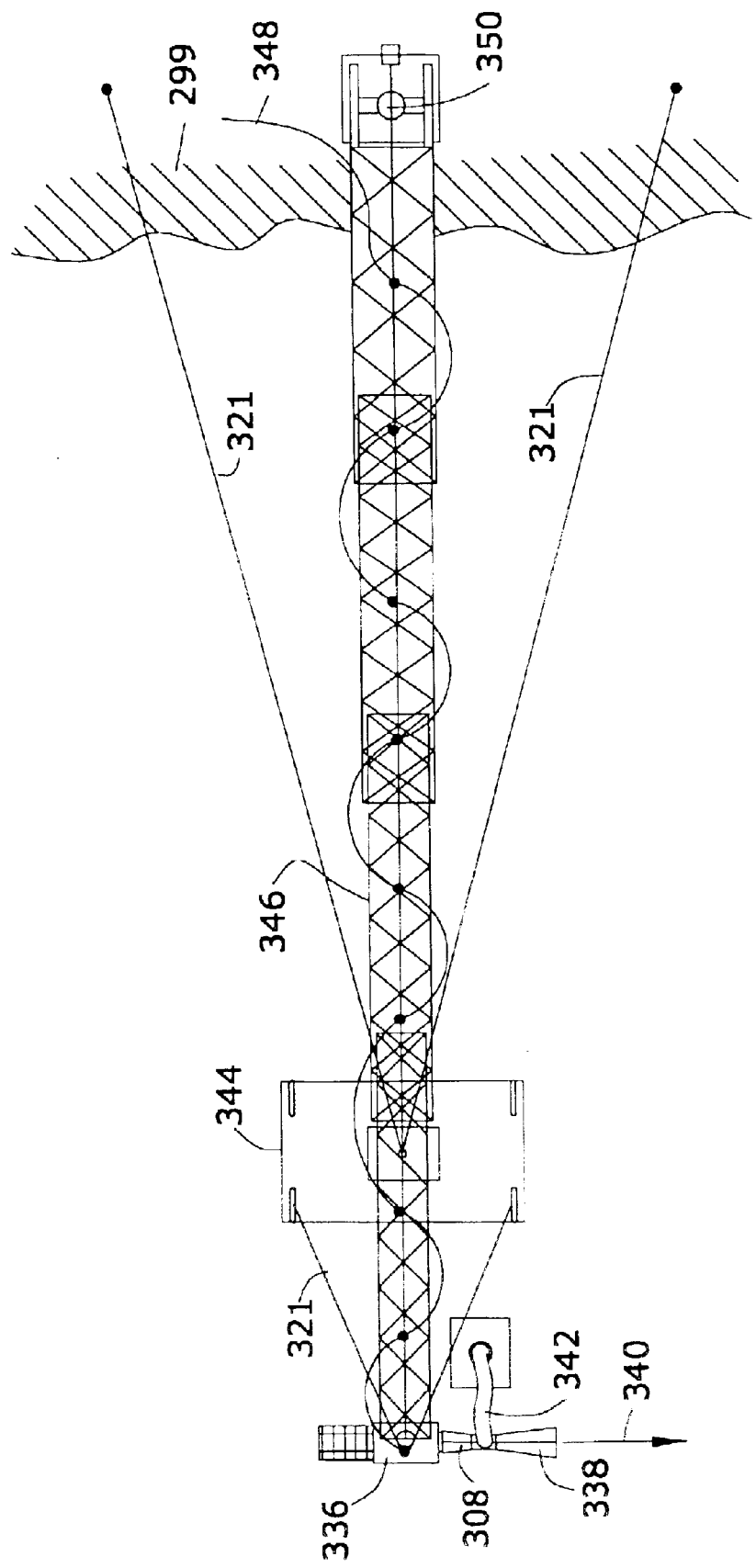
FIGS. 8A and 8B are top and side views, respectively, of an eductor assembly used in the process of the invention.
Figure 8B:
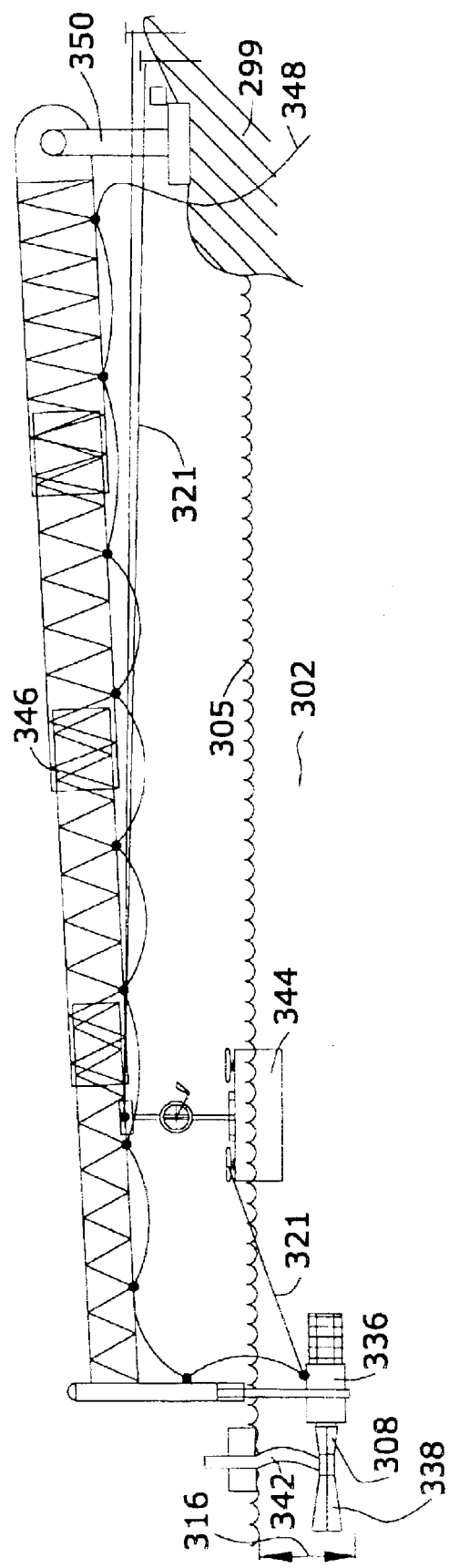

Referring again to FIG. 6, and also to FIG. 8B, it will be seen that each of the eductors 308/310/312 is also submerged beneath surface 305 of lagoon 302 by a distance 316 of at least about 3 feet and, more preferably, at least about 6 feet.

In one embodiment, it is preferred that the distance 307 (see FIG. 7A) by which the bioreactor 304/306 is submerged beneath the water surface 305 be at least 1 feet greater than the distance 316 by which the eductor 308/310/312 is submerged.

In the embodiment depicted in FIG. 6, the bioreactors 304 and 306 are anchored to land 320 by means of cables 321, and by means of floating dock 322. The eductors 308/310/312 also may be anchored to land by, e.g., cables 321.

Figure 7A:
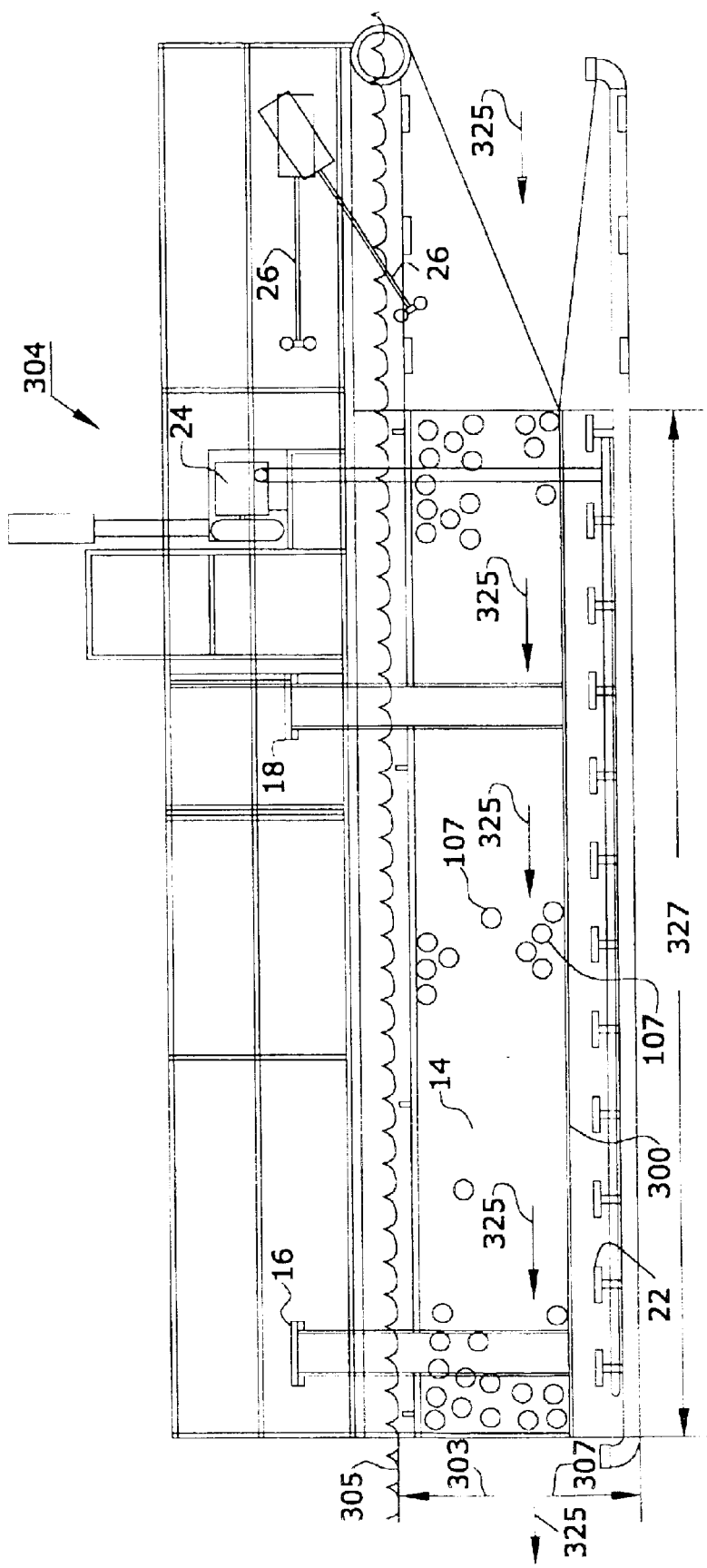

FIGS. 7A and 7B are side and front views of a bioreactor 304 that is similar to the bioreactor 10 depicted in U.S. Pat. No. 6,231,766, the entire disclosure of which is hereby incorporated by reference in this specification. With regard to this bioreactor 10 (and also to bioreactor 304), such U.S. patent discloses that " . . . biofeeder 10 is comprised of installation runners 14 which assist in the placement of the biofeeder 10 within the body of water 12; in one embodiment, runners 14 are filled with concrete or sand. Referring to FIG. 1, the runners 14 will evenly distribute the weight of biobreeder 10 on the bank 16 of the body of water 12 and readily allow the biobreeder to enter and/or exit such body of water 12."

Such patent also discloses that "As will be apparent to those skilled in the art, bank 16 and/or base 18 of body of water 12 is often covered with a water-impervious material, such as high density polyethylene. The high density polyethylene liners, which are often also known as landfill liners, are well known to those skilled in the art and are described, e.g. in U.S. Pat. Nos. 5,607,234, 5,597,194, 5,511,619 (abrasion resistant liner), U.S. Pat. No. 5,258,217 (landfill liner), U.S. Pat. No. 5,076,728, and the like". The entire disclosure of U.S. Pat. Nos. 5,511,619; 5,258,217 and 5,076,728 is hereby incorporated by reference into this specification.

The patent further discloses that "It is preferred that the sides, top, and bottom of frame 34 be clad with suitable retaining means so that the material disposed within such frame 34 cannot escape into the body of water 12. FIG. 5 is an exploded view of one preferred embodiment of frame 34 showing some suitable cladding. Referring to FIG. 5, it will be seen that sheet 48 of plastic material is attached to the right side of frame structure 34 by conventional means such as, e.g., plastic fasteners. In the embodiment depicted, sheet 48 is depicted as being an integral structure. In another embodiment, not shown, sheet 48 may be comprised of several distinct sheets of plastic material which are joined together by conventional means."

Referring to FIGS. 7A and 7B, the bioreactor 304 preferably differs from the bioreactor 10 disclosed in such U.S. Pat. No. 6,231,766 in that the aerator 26 is preferably disposed outside of the enclosure 14 within which the biosuspension elements 107 are disposed. By comparison, and referring again to element 10 of U.S. Pat. No. 6,231,766, the aerator 108 therein is disposed within the enclosure within which the biosuspension elements are disposed. Without wishing to be bound to any particular theory, applicants believe that the former arrangement is substantially more efficient.

Referring again to FIGS. 7A and 7B, water is passed through the bioreactor 304 at a rate of at least 20 feet per minute and, more preferably, at least about 30 feet per minute, in the direction of arrow 325.

Simultaneously, and in the embodiment depicted, air is preferably forced through screen 300 at a rate of from about 250 to about 350 cubic feet per minute of air.

Referring again to FIGS. 7A and 7B, and in the embodiment depicted, it will be seen that the biosuspension elements 107 are disposed within enclosure 14 but above screen 300. In one embodiment, at least a portion of such biosuspension elements 107 are contiguous with and supported by such screen 300.

Treated water is produced in zone 327 of the bioreactor 304 and removed therefrom in the direction of arrow 325 at a rate of at least about 20 feet per minute and, more preferably, at a rate of at least about 40 feet per minute.

Referring again to FIGS. 7A and 7B, it will be seen that, disposed beneath screen 300 are at least two bubblers 22 that provide flow of an oxygen-containing gas.

In the embodiment depicted in FIG. 7A, at least about 6 bubblers 22 are disposed beneath the screen 300 and provide oxygen-containing gas. Regardless of the number of such bubblers 22 used, it is preferred that they provide at least about 200 pounds of dissolved oxygen for each 24 hours. In one embodiment, the multiplicity of bubblers 22 provides at least about 250 pounds of dissolved oxygen each 24 hours.

Referring again to FIG. 7A, and in the preferred embodiment depicted therein, disposed between adjacent bubblers 22 preferably is a manifold/fluid jet assembly 330 adapted to provide compressed fluid (such as air, liquid, etc). A compressor (not shown) is preferably used to compress the fluid used in the system. As will be apparent, such compressed fluid may be intermittently used to remove accumulations of dead biomass (not shown).

FIGS. 8A and 8B are top and side views, respectively, of water eductor 308. This eductor 308, which preferably is submerged beneath the surface 305 of water 302 by a distance of at least about 3 feet, is adapted to move water through it at a rate of at least about 60 feet per minute while aerating such water.

In one embodiment, depicted in FIGS. 8A/8B, a submerged pump 336 circulates lagoon water through a venturi 338 of eductor 308.

The lagoon water discharged from the eductor 308 flows in the direction of arrow 340 in a direction that is substantially parallel to the surface 305 of water 302. As used herein, the term substantially parallel refers to plus or minus ten degrees.

Thus, as will be apparent to those skilled in the art, the submerged eductor 308 provides a water flow beneath the surface 305 that is substantially parallel to such surface. Such water flow occurs at least about 3 feet beneath surface 305.

The eductor 308, in addition to providing the submerged, substantially parallel fluid flow, also aerates such fluid flow. Surface air is fed via line 342 to venturi 338 which mixes such air with the water educted.

In the embodiment depicted in FIGS. 8A and 8B, a flotation device 344 to which the eductor 308 is connected by means of adjustable boom 346 is used. The adjustable boom 346 is preferably attached by means of cables 321 to land 299. Power may be supplied to such a system by conventional means such as, e.g., electrical cable 348.

In the embodiment depicted, the boom 346 is supported by a base 350.

It is to be understood that the aforementioned description is illustrative only and that changes can be made in the apparatus, in the ingredients and their proportions, and in the sequence of combinations and process steps, as well as in other aspects of the invention discussed herein.

We claim:

1. A process for treating a body of water, comprising the steps of:
    (a) disposing a first bioreactor and a first water eductor in said body of water, wherein:
        1. said first bioreactor is comprised of an enclosure, a screen disposed within said enclosure, and a plurality of bio suspension units disposed above said screen,
        2. said bio suspension units provide surfaces for supporting the growth of at least five different biological microorganisms, and
        3. said first bioreactor is separated from said first water eductor by a distance of at least about 10 feet wherein said first bioreactor and said first water educator are fluidly connected such that output from said first bioreactor provides input for said water eductor, and
        4. said water eductor is disposed at least about 3 feet below the top surface of said body of water,
    (b) feeding water into said enclosure at a rate of at least about 20 feet per minute,
    (c) introducing said at least five different biological microorganisms into said enclosure, (d) moving water through said first water eductor at a rate of at least about 60 feet per minute to provide a water flow in a direction that is substantially parallel to said top surface of said body of water but that is disposed at least about 3 feet below said top surface of said body of water, and (e) removing treated water from said enclosure.

2. The process as recited in claim 1, comprising the step of disposing said first bioreactor and a second bioreactor within said body of water.

3. The process as recited in claim 1, wherein said at least a portion of said first bioreactor is submerged beneath said top surface of said body of water to a depth of at least about 3 feet.

4. The process as recited in claim 3, wherein said portion of said first bioreactor is submerged beneath said top surface of said body of water to a depth that is at least about 1 foot greater than the depth said water eductor is submerged beneath said top surface of said body of water.

5. The process as recited in claim 1, wherein said first bioreactor is fixedly disposed in said body of water.

6. The process as recited in claim 5, wherein said first bioreactor is anchored to land.

7. The process as recited in cairn 1, further comprising a dock connected to said first bioreactor.

8. The process as recited in claim 1, wherein said aerator is disposed outside of said enclosure.

9. The process as recited in claim 1, further comprising the step of passing air through said screen disposed within said enclosure.

10. The process as recited in claim 9, wherein said air is passed through said screen disposed within said enclosure at a rate of from about 250 to about 350 cubic feet per minute.

11. The process as recited in claim 1, further comprising disposing at least two bubblers beneath said screen disposed within said enclosure.

12. The process as recited in claim 11, comprising disposing at least six bubblers beneath said screen disposed within said enclosure.

13. The process as recited in claim 12, wherein said six bubblers disposed beneath said screen provide at least 200 pounds of dissolved oxygen during each 24 hours of operation.

14. The process as recited in claim 1, further comprising circulating water through a submerged pump.

15. The process as recited in claim 14, wherein said first water eductor is comprised of a venturi.

16. The process as recited in claim 15, wherein said submerged pump circulates water through said venturi of said first water eductor.

17. The process as recited in claim 16, further comprising the step of aerating water within said first water eductor.

* * * * *